United States Patent [19]

Nakaoka et al.

[11] Patent Number: 4,609,251

[45] Date of Patent: Sep. 2, 1986

[54] ROTARY DRIVE DEVICE

[75] Inventors: Masaki Nakaoka, Yokohama; Teruo Komatsu; Shinji Goto, both of Tokyo, all of Japan

[73] Assignee: Canon Kabushiki Kaisha, Tokyo, Japan

[21] Appl. No.: 521,330

[22] Filed: Aug. 8, 1983

[30] Foreign Application Priority Data

Aug. 14, 1982 [JP] Japan ................................ 57-141222

[51] Int. Cl.[4] .............................................. G02B 26/10
[52] U.S. Cl. ...................................... 350/6.8; 310/75 D
[58] Field of Search ......................... 350/6.8; 310/75 D

[56] References Cited

U.S. PATENT DOCUMENTS

| | | | |
|---|---|---|---|
| 3,772,464 | 11/1973 | Chan et al. ......................... | 350/6.8 |
| 3,918,574 | 11/1975 | Allison .............................. | 310/75 D |
| 4,523,800 | 6/1985 | Yamashita et al. ................. | 350/6.7 |

FOREIGN PATENT DOCUMENTS 55810  5/1981  Japan .

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

The present invention provides an apparatus for rotationally driving a member to be rotated about a rotating shaft, said apparatus including a central fixed shaft, a hollow shaft rotatably mounted on the central shaft through bearings, a member adapted to be rotated with the hollow shaft, a rotor held by the hollow shaft, and a stator fixedly supported opposed to the rotor.

4 Claims, 5 Drawing Figures

ROTARY DRIVE DEVICE

BACKGROUND OF THE INVENTION

1. Field of the Invention

The present invention relates to a rotary drive device used as a motor having high rotational speed with high accuracy, such as a motor for driving a rotary polygon mirror which is used in a recording system such as a laser beam printer (LBP), a motor for driving a video tape recorder or video disc player, or the like.

2. Description of the Prior Art

It is known that an image recording system obtaining prints based on digital signals, such as LBP, digital copier or the like, generally utilizes a laser scan type optical system as shown in FIG. 1.

Such an optical system comprises a laser unit 1 actuated and stopped in accordance with digital signals, a rotary polygon mirror 2 rotatable about a shaft 6 for deflecting and scanning the laser light along the axial direction of the shaft 5 of a drum 4 having a photosensitive layer which is formed therein at the outer periphery, and a lens system 3. A latent image formed on the photosensitive layer by the laser scanning light is succeedingly subjected to development, transfer and fixation to form a visible image, in accordance with an electrophotographic process such as Carlson process, PIP process or others.

Among the components of the optical system, the rotary polygon mirror 2 is the most important component. It cannot be attained to stabilize and improve the image in quality unless the polygon mirror 2 is rotated with higher accuracy. A motor for driving the rotary polygon mirror is therefore placed under severe conditions, particularly with respect to the following requirements which are also true of motors for VTR or others:

1. Reduced irregularity in rotation;
2. Reduced deflection of shaft;
3. No scattering of grease or oil from bearings;
4. Revolution higher than 4000 r.p.m. in general; and
5. Rotation for a long period of time without reducing the accuracy and without any noise.

To fulfill the above requirements, the prior art employed a motor for directly driving the polygon 2 as shown in FIG. 2. This motor comprises a shaft 12 on which high-precision bearings 7 and 11, a rotor magnet 8 and balance rings 15 and 16 are press-fitted or bonded. The upper bearing 7 is bonded to a holder 30 which is in turn fixed to a closure 17. The lower bearing 11 is mounted in a motor casing 18 movable in the vertical direction. The lower bearing 11 is upwardly urged by a spring 13 located between the outer race of the bearing 11 and a spring seat 35 which is fixed to the motor casing 18, so that the lower bearing 11 can firmly be positioned without any play and/or deflection. There is a stator 9 located around the rotor magnet 8 and spaced outwardly therefrom. Below the stator 9 there is located a Hall element 10. The rotor magnet 8, stator 9 and Hall element 10 define the so-called D.C. Hall motor. The balance ring 15 includes a black-and-white pattern printed thereon at the outer periphery which pattern is detected by means of a reflection type photocoupler 14 to obtain signals for controlling the revolution of the rotor magnet 8.

The polygon 2 is sealed by a cap 19 which is mounted on the closure 17. The cap 19 includes a plurality of openings 20 formed therein at the peripheral wall thereof and closed by glass sheets. Laser beam is adapted to enter and exit the cap 19 through the openings 20. There is a magnetic seal 28, a mechanical seal such as labyrinth or the like which prevents the mirror faces of the polygon from subjecting to contamination due to any scattering of grease from the bearing.

There is also known another type of motor which is an outer rotor type D.C. motor directly connected to a spindle having bearings at the opposite ends (bearing unit). In any event, the rotary polygon mirror, bearings and the rotor for driving the mirror (rotor magnet 8 in FIG. 1) are mounted on a single shaft at positions spaced away from each other in the longitudinal direction. Accordingly, the system cannot be made compact. Since the upper and lower bearings are centered by the use of many separately constructed components (the holder 30, closure 17 and motor casing 18 in FIG. 1), the deflection in the shaft cannot completely be eliminated. If the rotational speed of the motor is increased, it is desirable that the motor is lubricated by oil in the form of droplets rather than the enclosed grease in view of the life of bearings. However, this cannot be performed in the above motor construction. That is, the electronic components, for example, such as Hall element 10 and the photo-coupler 14 will be possibly contaminated with grease in such a construction.

SUMMARY OF THE INVENTION

In view of the disadvantages in the prior art, it is an object of the present invention to provide an improved and novel rotary drive device.

Another object of the present invention is to provide a rotary drive device actuated with higher accuracy.

Still another object of the present invention is to provide a rotary drive device having no scattering of oil or the like.

A further object of the present invention is to provide a rotary drive device which can be actuated for a long period of time at a high speed without any change of accuracy.

In order to accomplish the above objects, the present invention provides a rotary drive device comprising a central fixed shaft, a hollow shaft rotatably mounted on the central shaft through bearings, a member adapted to be rotated in unison with the hollow shaft, a rotor held by the hollow shaft, and a stator fixedly supported opposed to the rotor.

DESCRIPTION OF THE PREFERRED EMBODIMENTS

Figure 1:
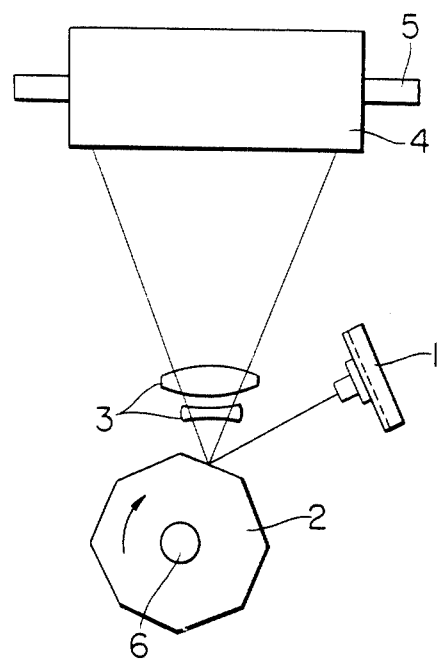
FIG. 1 illustrates a laser scan type optical system.
Figure 2:
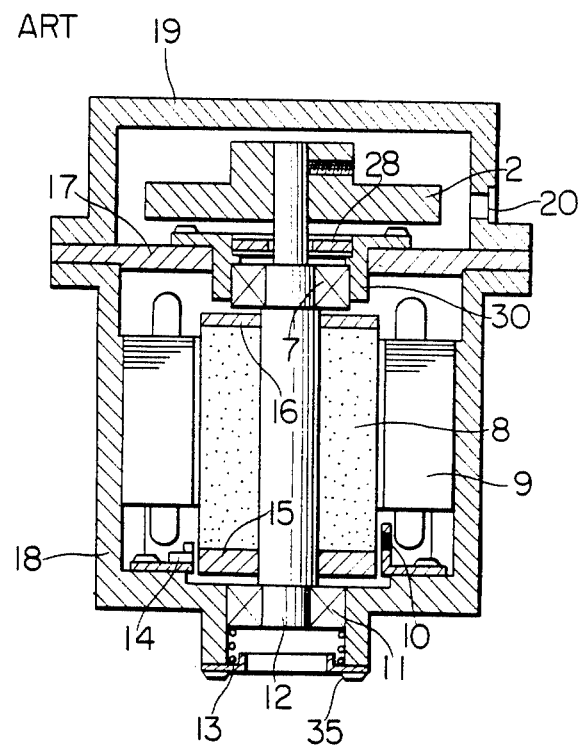
FIG. 2 is a longitudinal cross-section of the prior art construction.
Figure 3:
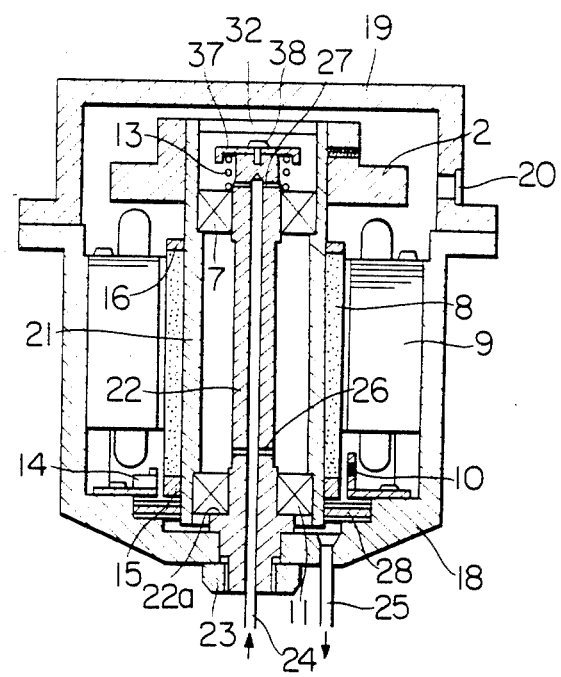
FIGS. 3 to 5 are longitudinal cross-sections of embodiments according to the present invention, respectively.

FIG. 3 shows a D.C. Hall motor constructed in accordance with the present invention which is actuated in a manner similar to that of FIG. 1. The construction of the motor shown in FIG. 3 is the same as that of FIG. 1 except that in FIG. 3, a central shaft 22 mounted in the motor casing 18 includes a threaded end portion on which a nut 23 is screwed to position the central shaft 22. The upper bearing 7 is fitted over the central shaft 22 movably in the vertical direction. On the other hand, the lower bearing 11 is fixed to the central shaft 22 as by press-fit or bonding and engaged by a shoulder 22a formed on the shaft 22. The outer races of the bearings 7 and 11 is press-fitted or bonded within a hollow shaft 21 to the outer wall of which the polygon 2, rotor magnet 8 and balance rings 15 and 16 are fixed by any suitable means such as screwing or bonding. When a current is supplied to the stator 9, the hollow shaft 21 is energized to rotate. The bearings 7 and 11 are urged by means of a spring 13 which is located between a spring seat 37 secured to the reduced diameter of the end portion of the central shaft 22 by a machine screw 38 and the inner race of the bearing 7.

Consequently, the motor is constructed compactly in its axial direction since the bearings 7 and 11 disposed inwardly from the ends of the hollow shaft 21. More importantly, both the bearings 7 and 11 are centered only by the central shaft 22 integral therewith. The hollow shaft 21 is only one cylinder so that it can be manufactured and assembled with less deflection. Therefore, this is advantageous in that a laser beam from LBP or the like can more accurately be focused at a predetermined position on the drum, and so on.

The top opened end of the hollow shaft 21 may be closed by any suitable means such as a closure 32. This ensures that the mirror faces of the polygon 2 will not be contaminated by any grease scattered from the bearing 7.

Furthermore, there may be provided a magnetic seal 28 or a mechanical seal around the lower portion of the hollow shaft 21 to seal a space between the seal and the inner bottom of the motor casing. Accordingly, lubricating oil can be circulated from a passage 24 through passages 26, 27 in the central shaft 22 to a discharge passage 25. As a result, the bearings 7 and 11 can be prolonged in life with the noise being reduced.

Although the illustrated construction has been described as a D.C. Hall motor, the present invention is not limited to such a motor. If the motor is a D.C. brush motor, its armature would be mounted about the hollow shaft 21 as a rotor in place of the rotor magnet 8. If the motor is a hysteresis motor, its hysteresis ring would be mounted over the hollow shaft 21. If the motor is an air turbine, its air blade assembly would be mounted over the hollow shaft 21.

Figure 4:
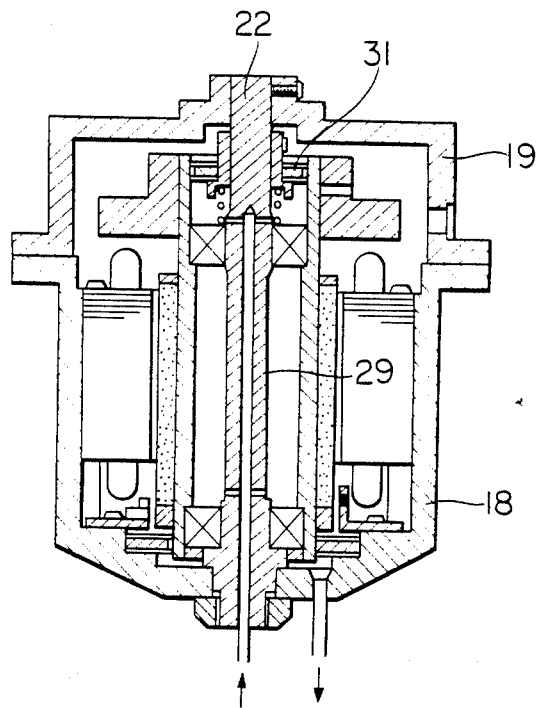

FIG. 4 shows another embodiment of the present invention in which a central shaft 29 is fixed to both the cap 19 and motor casing 18 to increase the central shaft in rigidity. Consequently, the central shaft 29 may be reduced in its outer diameter. This means that a hollow rotating shaft can also be reduced in its diameter so that the motor can be actuated at higher rotational speed and constructed into more compact configuration.

In the construction shown in FIG. 4, a magnetic seal 31 is provided to prevent the grease from scattering to the polygon.

Figure 5:
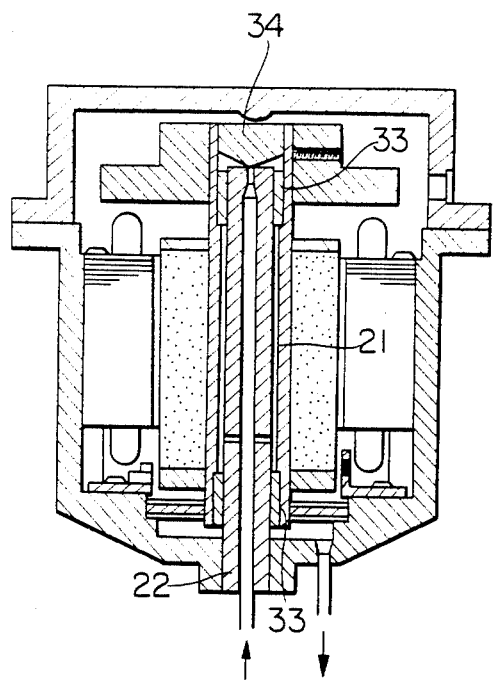

FIG. 5 shows still another embodiment of the present invention in which sliding bearings 33 and 34 are utilized in the motor. Each of the sliding bearings 33 and 34 is press-fitted on the rotating shaft 21 and lubricated by oil which is circulated through passages formed in the central shaft 22. As seen from FIG. 5, the shafts may be reduced in diameter to make the motor more compact.

Although the illustrated embodiments of the present invention have been described as vertically installed motors, the present invention is not limited to the position of the motor.

What we claim is:

1. A rotary drive device comprising:
   a central shaft fixed to a housing;
   a hollow rotatable member rotatably supported through a bearing on a periphery of said central shaft;
   a rotated member supported on said hollow rotatable member and integrally rotated therewith; and
   drive means for driving to rotate said hollow rotatable member, said drive means comprising a rotor mounted on said hollow rotatable member and a stator fixedly supported on the housing in opposition to said rotor, the inside of said central shaft being formed with a passage for circulating lubricating oil therethrough.

2. A rotary drive device according to claim 1, wherein the hollow region of said hollow rotatable member is closed at at least one of the openings thereof by a cover member.

3. A rotary drive device according to claim 2, wherein the hollow region of said hollow rotatable member is closed at its end closest to the rotated member, and the central shaft is fixed to the housing near the opposite end of the hollow rotatable member.

4. A rotary drive device comprising:
   a central shaft fixed to a housing;
   a hollow rotatable member rotatably supported through a bearing on a periphery of said central shaft;
   a rotated member supported on said hollow rotatable member and integrally rotated therewith; and
   drive means for driving to rotate said hollow rotatable member, said drive means comprising a rotor mounted on said hollow rotatable member and a stator fixedly supported on the housing in opposition to said rotor, the hollow region of said hollow rotatable member being closed at at least one of its openings by a cover member, said central shaft being fixed to the housing at both shaft ends, and the hollow region of the hollow rotatable member being closed at its end closest to the rotated member in such a manner that the central shaft passes through said cover member.

* * * * *